US010046688B2

(12) United States Patent
Salter et al.

(10) Patent No.: US 10,046,688 B2
(45) Date of Patent: Aug. 14, 2018

(54) VEHICLE CONTAINING SALES BINS

(71) Applicant: Ford Global Technologies, LLC, Dearborn, MI (US)

(72) Inventors: Stuart C. Salter, White Lake, MI (US); Annette Lynn Huebner, White Lake, MI (US); Pamela Vergos Wylie, Canton, MI (US); Pietro Buttolo, Dearborn Heights, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 15/286,848

(22) Filed: Oct. 6, 2016

(65) Prior Publication Data

US 2018/0099602 A1    Apr. 12, 2018

(51) Int. Cl.
| | |
|---|---|
| *B60P 3/025* | (2006.01) |
| *B60Q 1/00* | (2006.01) |
| *B60Q 1/24* | (2006.01) |
| *G09F 13/22* | (2006.01) |
| *E04H 15/08* | (2006.01) |
| *F21V 9/16* | (2006.01) |
| *F21V 9/30* | (2018.01) |
| *F21Y 115/10* | (2016.01) |

(52) U.S. Cl.
CPC ............ *B60P 3/0257* (2013.01); *B60P 3/0255* (2013.01); *B60Q 1/0035* (2013.01); *B60Q 1/24* (2013.01); *E04H 15/08* (2013.01); *F21V 9/16* (2013.01); *F21V 9/30* (2018.02); *G09F 13/22* (2013.01); *F21Y 2115/10* (2016.08); *G09F 2013/227* (2013.01)

(58) Field of Classification Search
CPC ....... B60P 3/025; B60P 3/0255; B60P 3/0257; B62D 39/00; E04H 15/08
USPC .................................................... 296/21, 22
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |

(Continued)

FOREIGN PATENT DOCUMENTS

| | | |
|---|---|---|
| CN | 201019377 Y | 2/2008 |
| CN | 101337492 A | 1/2009 |

(Continued)

OTHER PUBLICATIONS

English translation of JP 02-283537; retreived via JPLAT-PAT located at https://www.j-platpat.inpit.go.jp/web/all/top/BTmTopEnglishPage. (Year: 2018).*

(Continued)

*Primary Examiner* — Jason S Daniels
(74) *Attorney, Agent, or Firm* — Jason Rogers; Price Heneveld LLP

(57) ABSTRACT

Autonomous vehicle is provided which includes a plurality of sales bins positioned on a side of the vehicle. An awning is configured to deploy from the vehicle over the sales bins. The awning includes a first light source which is configured to illuminate a ground space proximate the awning. A second light source is configured to illuminate the sales bins. A sensor is configured to detect an electronic device proximate the vehicle.

19 Claims, 8 Drawing Sheets

(56) References Cited

U.S. PATENT DOCUMENTS

| | | |
|---|---|---|
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,260,988 B1 | 7/2001 | Misawa et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,354,182 B2 | 4/2008 | Bartels |
| 7,360,813 B2 * | 4/2008 | Ting ................... A61G 3/001 296/24.38 |
| 7,441,914 B2 | 10/2008 | Palmer et al. |
| 7,458,698 B2 | 12/2008 | Heathcock et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,103,414 B2 | 1/2012 | Boss et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,408,765 B2 | 4/2013 | Kuhlman et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,937,454 B2 | 1/2015 | Baarman et al. |
| 8,952,341 B2 | 2/2015 | Kingsley et al. |
| 8,963,705 B2 | 2/2015 | Miller et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,194,168 B1 | 11/2015 | Lu et al. |
| 9,299,887 B2 | 3/2016 | Lowenthal et al. |
| 9,315,148 B2 | 4/2016 | Schwenke et al. |
| 9,442,888 B2 | 9/2016 | Stanfield et al. |
| 9,568,659 B2 | 2/2017 | Verger et al. |
| 9,579,987 B2 | 2/2017 | Penilla et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0030136 A1 | 2/2007 | Teshima et al. |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0001406 A1 | 1/2012 | Paxton et al. |
| 2012/0020101 A1 | 1/2012 | Pastrick et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0009855 A1 | 1/2013 | Gally et al. |
| 2013/0050979 A1 | 2/2013 | Van De Ven et al. |
| 2013/0092965 A1 | 4/2013 | Kijima et al. |
| 2013/0154821 A1 | 6/2013 | Miller et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0288832 A1 | 9/2014 | Hoch et al. |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0324708 A1 | 11/2015 | Skipp et al. |
| 2015/0339928 A1 | 11/2015 | Ramanujam |
| 2015/0346727 A1 | 12/2015 | Ramanujam |
| 2015/0366036 A1 | 12/2015 | Luostarinen |
| 2016/0016506 A1 | 1/2016 | Collins et al. |
| 2016/0082880 A1 | 3/2016 | Co et al. |
| 2016/0102819 A1 | 4/2016 | Misawa et al. |
| 2016/0131327 A1 | 5/2016 | Moon et al. |

(56) References Cited

U.S. PATENT DOCUMENTS

| | | | |
|---|---|---|---|
| 2016/0214535 A1 | 7/2016 | Penilla et al. | |
| 2016/0236613 A1 | 8/2016 | Trier | |
| 2017/0158125 A1 | 6/2017 | Schuett et al. | |
| 2017/0213165 A1 | 7/2017 | Stauffer et al. | |

FOREIGN PATENT DOCUMENTS

| | | | |
|---|---|---|---|
| CN | 201169230 Y | | 2/2009 |
| CN | 201193011 Y | | 2/2009 |
| CN | 201951327 U | | 8/2011 |
| CN | 202357840 U | | 8/2012 |
| CN | 103770690 A | | 5/2014 |
| CN | 204127823 U | | 1/2015 |
| CN | 104869728 A | | 8/2015 |
| CN | 105303642 A | | 2/2016 |
| DE | 4120677 A1 | | 1/1992 |
| DE | 29708699 U1 | | 7/1997 |
| DE | 10319396 A1 | | 11/2004 |
| EP | 1793261 A1 | | 6/2007 |
| EP | 2719580 A1 | | 4/2014 |
| EP | 2778209 A1 | | 9/2014 |
| JP | 02283537 A | * | 11/1990 |
| JP | 2000052859 A | | 2/2000 |
| JP | 2000159011 A | | 6/2000 |
| JP | 2007238063 A | | 9/2007 |
| KR | 20060026531 A | | 3/2006 |
| WO | 2006047306 A1 | | 5/2006 |
| WO | 2008093266 A1 | | 8/2008 |
| WO | 2014068440 A1 | | 5/2014 |
| WO | 2014161927 A1 | | 10/2014 |

OTHER PUBLICATIONS

Concession Capital; www.concessioncapital.com/16-Food-Trucks; 16' Food Trucks; Apr. 12, 2016 2 pages.

Costco; www.costoco.com/SunSetter-Dimming-LED-Awning-Lights.product; Apr. 12, 2016 4 pages.

Food Trucks; www.foodtrucks.net/food-truck-accessories; Apr. 12, 2016; 5 pages.

* cited by examiner

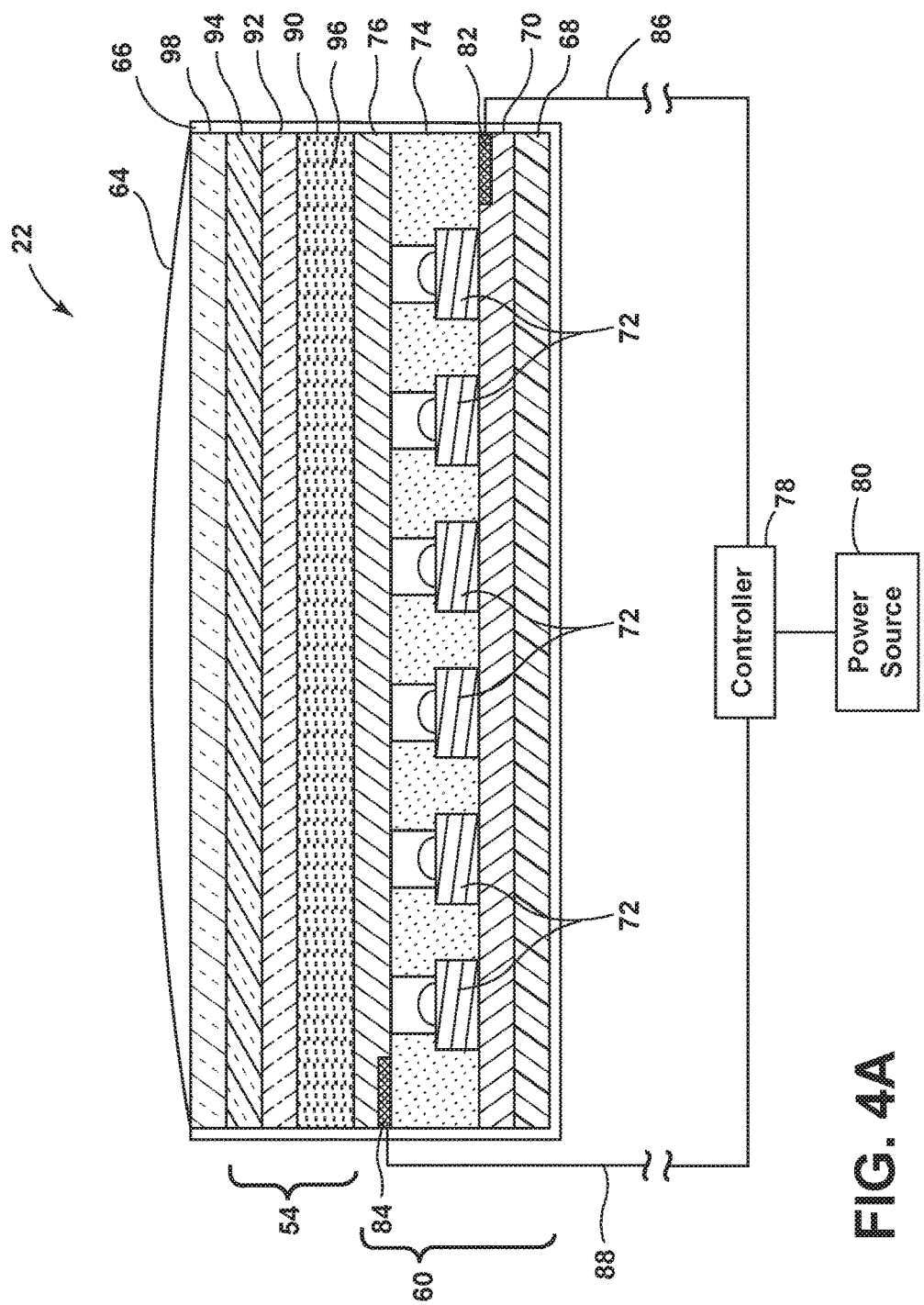

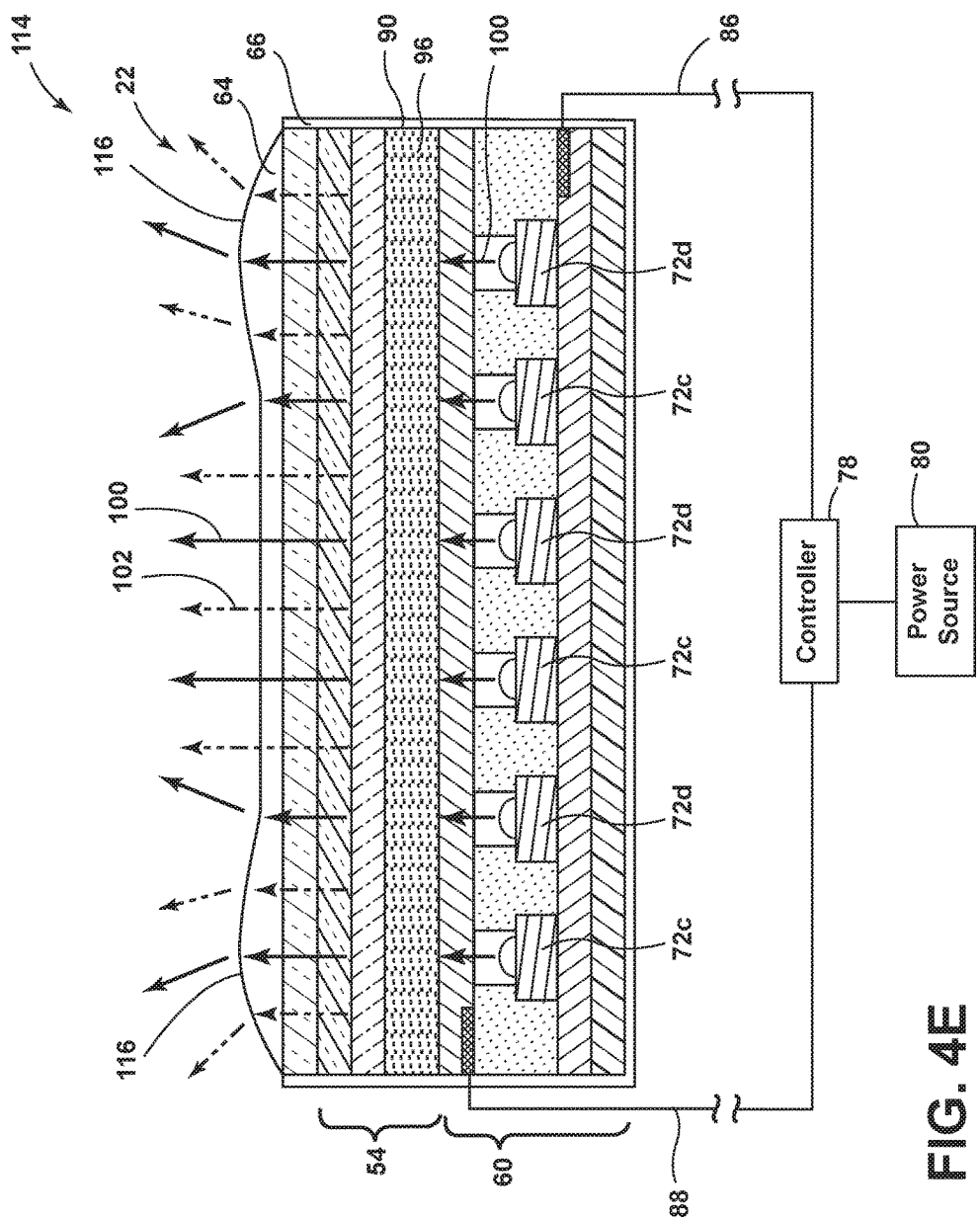

VEHICLE CONTAINING SALES BINS

FIELD OF THE INVENTION

The present invention generally relates to vehicles containing sales bins, and more particularly to autonomous vehicles containing sales bins.

BACKGROUND OF THE INVENTION

Vehicles containing sales bins may offer a variety of commercial and social benefits. Accordingly, easing purchasing of products from such vehicles may be advantageous.

SUMMARY OF THE INVENTION

According to one aspect of the present invention, an autonomous vehicle is provided which includes a plurality of sales bins positioned on a side of the vehicle. An awning is configured to deploy from the vehicle over the sales bins. The awning includes a first light source which is configured to illuminate a ground space proximate the awning. A second light source is configured to illuminate the sales bins. A sensor is configured to detect an electronic device proximate the vehicle.

According to another aspect of the present invention, a vehicle is provided which includes a plurality of bins positioned on the vehicle. An awning is configured to deploy from the vehicle proximate the bins. The awning includes a light source which is configured to illuminate the bins. A sensor is configured to detect an electronic device proximate the vehicle. The sensor is configured to detect bins preferences.

According to yet another aspect of the present invention, a vehicle is provided which includes a plurality of bins positioned on the vehicle. An awning is configured to deploy from the vehicle proximate the bins. A sensor is configured to detect an electronic device proximate the vehicle and the sensor is configured to detect the bin preferences from the electronic device.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4A is a cross-sectional view taken along line II-II of FIG. 1 illustrating a light assembly according to one embodiment;

FIG. 4E is a cross-sectional view taken along line II-II of FIG. 1 illustrating an alternate light source having a luminescent structure disposed on the light source configured to convert a portion of light emitted from the light source from a first wavelength to a second wavelength, according to one embodiment.

DETAILED DESCRIPTION OF THE PREFERRED EMBODIMENTS

Figure 1:
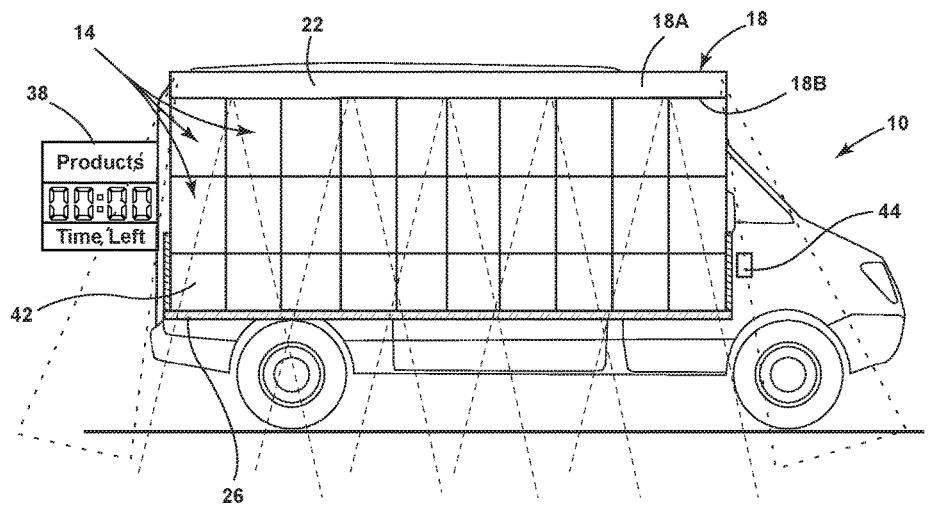
FIG. 1 is a side view of a vehicle equipped with sales bins, according to one embodiment.

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring now to FIGS. 1-5, reference numeral 10 generally designates a vehicle having a plurality of sale bins 14 positioned on a lateral side of vehicle 10. An awning 18 is configured to deploy from the vehicle 10 over the sales bins 14. The awning 18 includes a first light source 22 configured to illuminate a ground space proximate the awning 18 and a second light source 26 configured to illuminate the sales bins 14. A sensor 30 is configured to detect an electronic device 34 proximate the vehicle 10. At least one display 38 is configured to deploy from the vehicle 10. It will be understood that although referred to as the first light source 22 and the second light source 26, each of the light sources 22, 26 may include a plurality of light sources configured to cooperate or perform different tasks than one another.

Figure 2:
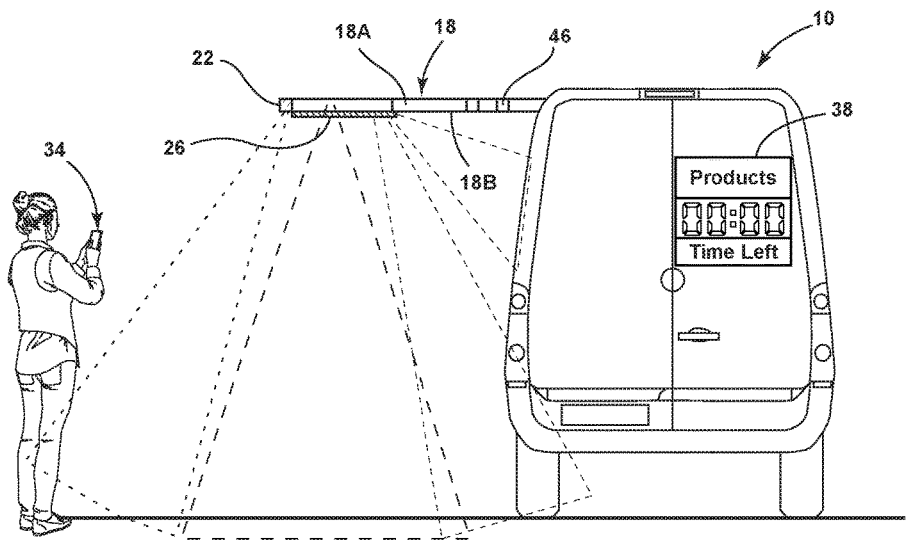
FIG. 2 is a rearview of the vehicle, according to one embodiment.
Figure 3:
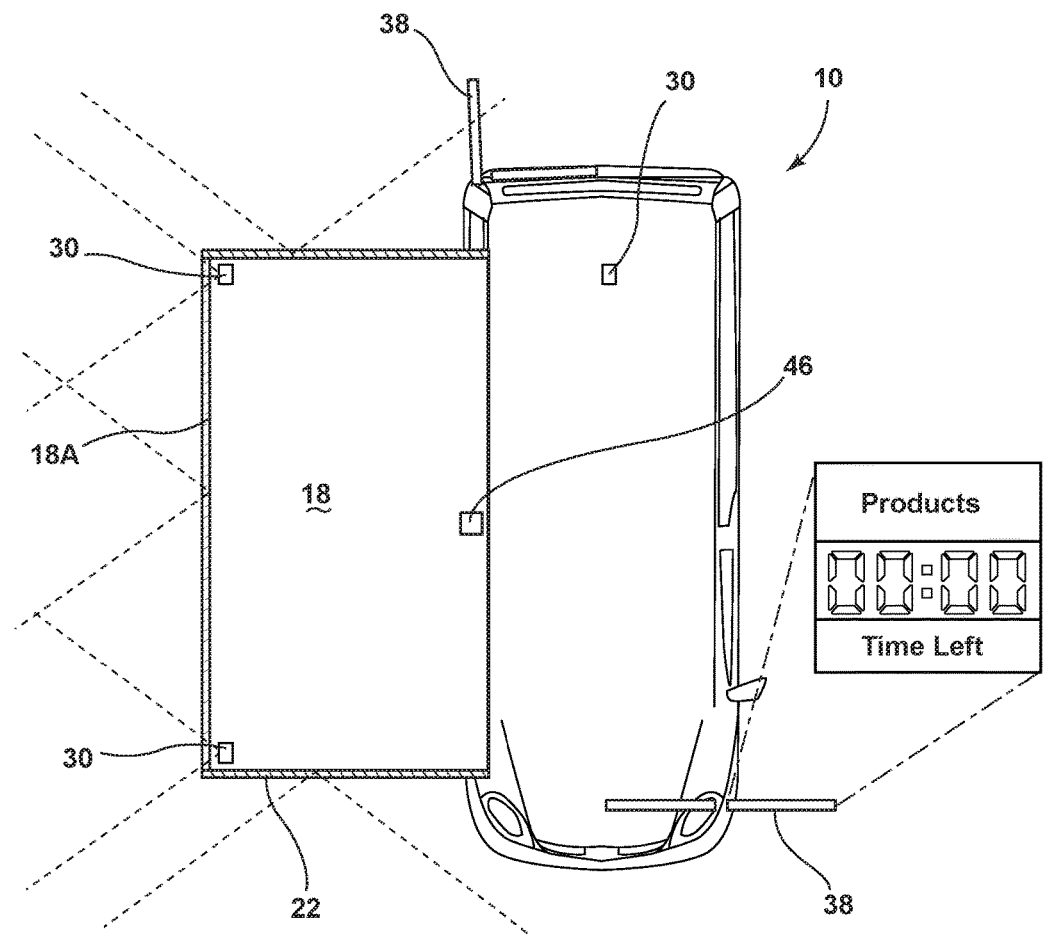
FIG. 3 is a top view of the vehicle, according to one embodiment.

Referring now to FIGS. 1-3, the vehicle 10 is depicted as a van, but it will be understood that the vehicle 10 may be a truck, sports utility vehicle, sedan, or other type of vehicle 10 without departing from the teachings provided here. Further, the vehicle 10 may be a manually operated vehicle (i.e. using a human driver) or may be autonomously driven by an on board computer. Additionally or alternatively, the vehicle 10 may be remotely controlled (e.g., via an operator located in a different location). Positioned on the vehicle 10 is the plurality of sales bins 14. The sales bins 14 may be a plurality of individual compartments, each with its own door and storage space defined therein. The sales bins 14 are configured to hold one or more products for sale by the vehicle 10. For example, the products within the sales bins 14 may include food stuffs, gifts, novelties, tools, etc. Each of the sales bins 14 includes a door 42 which may be locked until a controller of the vehicle 10 determines that a customer of the vehicle 10 should be granted access to the sales bin (e.g., the customer has paid or otherwise purchased the products with the sales bin 14). Further, the sales bins 14 may be climate controlled (e.g., heated, cooled, humidity controlled, etc.) to prevent damage to the products within the sales bins 14. The sales bins 14 allow the vehicle 10 to essentially function as a mobile vending machine. As explained above, the awning 18 extends from the vehicle 10 proximate the sales bins 14. The awning 18 may be operable between an undeployed position (e.g., disposed within a roof of vehicle 10 or folded down in front of the sales bins 14) and a deployed position in which the awning 18 extends from the vehicle 10 over the sales bins 14 and covers a ground space proximate the vehicle 10. For example, the awning 18 can either slide out of the roof of the vehicle 10 or swing up. According to various embodiments, the vehicle 10 may include one or more payment centers where a card, cash and/or electronic payment may be received. One or more proximity sensors may be employed on the vehicle 10 and/or awning 18 to detect persons or objects proximate the vehicle 10.

According to various embodiments, the vehicle 10 includes one or more displays 38. In a depicted embodiment, the vehicle 10 includes a display 38 positioned at a front of the vehicle 10 and a display 38 positioned at a rear of vehicle 10. The displays 38 are configured to communicate information about the vehicle 10 to customers of the vehicle 10. For example, the displays 38 may display the type of products carried in the sales bin 14, the owner operator of the vehicle 10, brand information related to the products carried in the sales bins 14, time left that the vehicle 10 will be in its current location, information about where the vehicle 10 has been or will go next and/or how much of each product is remaining in the sales bins 14. Further, the display 38 may be configured to display general information that a customer may be interested in such as the weather, time of day, etc. According various embodiments, the displays 38 may each include a countdown timer displaying how long the vehicle 10 will remain at its current location and open for business. The displays 38 may be configured to flash amber when the vehicle 10 is about to stop, illuminate green when the vehicle 10 is open for sales, and flash red when the vehicle 10 is about to end sales. The displays 38 may include a printed red, green, blue emitting diode display, a liquid crystal display, or other form of electronic display capable of providing changing information to the display 38. According to various embodiments, the displays 38 may be illuminated. The displays 38 are operable between an undeployed and a deployed position. In the deployed position, the displays 38 extend from the vehicle 10. For example, the display 38 located on a front of the vehicle 10, in the deployed position, may extend outwardly from the vehicle 10. In a specific embodiment, the display 38 located on the front of the vehicle 10 may, in an undeployed position, be located over a hood of the vehicle 10 and, in a deployed position, extend outwardly in a perpendicular configuration from a side of the vehicle 10 opposite that of the sales bins 14 and the awning 18. The rear display 38, in an undeployed position, may lay flat on a rear door of the vehicle 10 and, in a deployed position, extend in a substantially parallel direction with the side of the vehicle 10 outwardly from the vehicle 10. In other words, the display 38 located on a rear of the vehicle 10 may extend perpendicularly from the rear doors of the vehicle 10.

The vehicle 10 may include one or more alert switches 44. The alert switches 44 may be located in a variety of locations around the vehicle 10 including proximate the sales bins 14 and the displays 38. The alert switches 44 may include a physical button or touch pad. The alert switches 44 may be provided to alert an owner/operator of the vehicle 10, local law enforcement and/or emergency services of unsafe conditions and emergencies proximate the vehicle 10. For example, the alert switch 44 may be activated for a medical emergency or crime taking place proximate the vehicle 10. According to various embodiments, activation of the alert switch 44 may alter the lighting provided from the first and second light sources 22, 26 (e.g., intensity, color, location) as explained in greater detail below.

The awning 18 may include one or more sensors 30, the first and second light sources 22, 26 as well as an audio visual unit 46. The audio visual unit 46 may include a camera, a speaker, and/or a microphone or other audio pick up. The audio visual unit 46 may include the camera, speaker and/or audio pickup all in a single unit, or each of its components may be spread out across the awning 18. In camera embodiments of the audio visual unit 46, the camera may be configured to image an area under and/or proximate the awning 18 near by the sales bins 14. For example, the camera may be configured to image users of the vehicle 10. In speaker embodiments of the audio visual unit 46, the speaker may be configured to play tones and/or prerecorded messages which communicate to the customers of the vehicle 10 various information about the vehicle 10. For example, the speaker may play prerecorded messages or tones configured to indicate that the vehicle 10 is deploying the awning 18, a certain amount of time left that the vehicle 10 will remain in position and open for sales, that the awning 18 is closing, the available products in the sales bins 14, or other information a customer of the vehicle 10 may be interested in knowing. Further, this speaker may be configured to play music or other noises (e.g., product catch phrases, songs or tunes) that may entice customers of the vehicle 10 to be drawn to the vehicle 10 and purchase products from the sales bins 14. In audio pickup embodiments of the audio visual unit 46, the audio visual unit 46 may be configured to record noises proximate the vehicle 10 (e.g., customer speech) for security purposes and/or to allow customers of the vehicle 10 to communicate and/or ask questions. It will be understood that the audio visual unit 46 may be used to activate the alert switch 44 via voice. In embodiments where the vehicle 10 is remotely operated, the audio visual unit 46 may allow a remote operator of the vehicle 10 to communicate directly via voice with customers of vehicle 10 should they have questions or comments regarding operation of the vehicle 10. It will be understood that the audio visual unit 46 may additionally or alternatively be positioned on the vehicle 10.

According to various embodiments, the sensors 30 are positioned around the awning 18 and/or the vehicle 10. The sensors 30 may be Bluetooth™ low energy and/or Wi-Fi™ enabled wireless communication transceivers and are configured to detect the presence and preferences of the electronic device 34 proximate the vehicle 10. The electronic device 34 may include a cellphone, mobile communication device, a key FOB, wearable device (e.g., fitness band, watch, glasses, jewelry, wallet), apparel (e.g., a tee shirt, gloves, shoes or other accessories), personal digital assistant, headphones and/or other devices capable of wireless transmission (e.g., radio frequency, Bluetooth™, ultrasonic). As explained in greater detail below, by utilizing the sensors 30 to communicate with the electronic device 34, the location of the electronic device 34 as well as preferences of the owner of the electronic device 34 for types of products located within the sales bins 14 may be detected and communicated to a controller of the vehicle 10.

As explained above, the awning 18 includes the first light source 22 and the second light source 26. The first light source 22 may be positioned on sides 18A of the awning 18 and the second light source 26 may be positioned on a bottom surface 18B of the awning 18. The first light source 22 may be configured to provide an area, or ambient, lighting to the ground space proximate (e.g., below and around) the awning 18 and the vehicle 10. Further, the first and/or second light sources 22, 26 may outline a zone which customers of the vehicle 10 should stay clear of while the awning 18 is being deployed or retracted. The light emitted from the first light source 22 may have a warm color temperature (e.g., about 2700K) and have an intensity of between about 100 foot-candles to about 250 foot-candles. The first light source 22 is configured to provide a warm and inviting lighting experience to customers of the vehicle 10. The second light source 26 may be configured to provide lighting to the sales bins 14. The light emitted from the second light source 26 may have a cooler color temperature (e.g., about 3500K) than the first light source 22 and may have an intensity of between about 800 foot-candles to about 2000 foot-candles. Further, the light emitted from the second light source 26 may have a color rendering index of greater than 95 to enhance the appearance of products within the sales bins 14. A contrast ration between the light from the second light source 26 to the light from the first light source 22 may be about 8:1. Sensor readings from a day/night sensor of the vehicle 10 may be used to adjust the light emitted from the first and/or second light sources 22, 26. For example, the lighting may be adjusted to a level similar to that of the surroundings of the vehicle 10, or the lighting may be increased to higher than ambient conditions to make customers of the vehicle 10 feel safe at night. Light emitted from the first and/or second light sources 22, 26 may be varied in color and/or intensity. For example, the color and/or intensity of the light may be altered to indicate a condition (e.g., departing, time left, successful sale, danger sensed) of the vehicle 10. Further, using optics and/or selective light activation, as described in greater detail below, individual sales bins 14 may be highlighted by beam spotting (e.g., increasing the intensity of the light by about eight times that of the ambient area lighting) or color change to indicate a specific sales bin 14 to a customer.

Figure 4B:
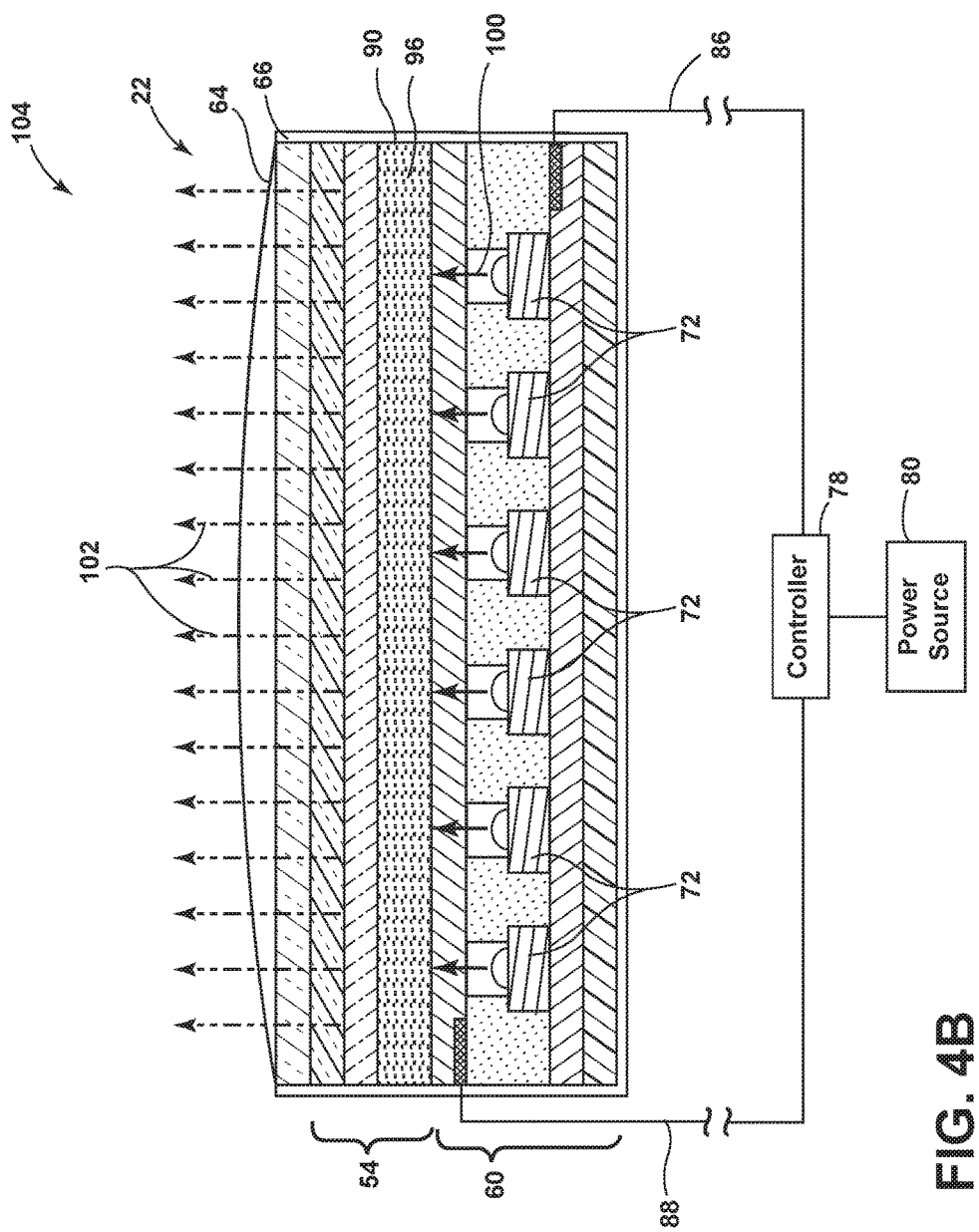
FIG. 4B is a cross-sectional view taken along line II-II of FIG. 1 further illustrating the light assembly, according to one embodiment.

Referring to FIGS. 4A-4E, a cross-sectional view of the first light sources 22 capable of use on the vehicle 10 with an external photoluminescent structure 54 is shown, according to various embodiments. Although depicted and described in connection with the second light source 26, it will be understood that the second light source 26 may be constructed in substantially the same manner. As illustrated in FIG. 4A, the light assembly 22 may have a stacked arrangement that includes a light-producing assembly 60, a photoluminescent structure 54, a viewable portion 64, and an overmold material 66. It will be understood that the viewable portion 64 and the overmold material 66 may be two separate components, or may be integrally formed as a single component.

Referring now to FIG. 4A, the light-producing assembly 60 may correspond to a thin-film or printed light emitting diode (LED) assembly and includes a substrate 68 as its lowermost layer. The substrate 68 may include a polycarbonate, poly-methyl methacrylate (PMMA), or polyethylene terephthalate (PET) material on the order of 0.005 to 0.060 inches thick and is arranged over the intended vehicle substrate 68 on which the first light source 22 is to be received. Alternatively, as a cost saving measure, the substrate 68 may directly correspond to a preexisting structure.

The light-producing assembly 60 includes a positive electrode 70 arranged over the substrate 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84, may also be placed in any orientation such that the light-producing assembly 60 may emit outputted light 102 (FIG. 4B) towards a desired location.

The LED sources 72 may be dispersed in a random or controlled fashion within the semiconductor ink 74 and may be configured to emit focused or non-focused light toward the photoluminescent structure 54. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be powered by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies 60 is disclosed in U.S. Patent Publication No. 2014/0264396 A1 to Lowenthal et al. entitled "ULTRA-THIN PRINTED LED LAYER REMOVED FROM SUBSTRATE," filed Mar. 12, 2014, the entire disclosure of which is incorporated herein by reference.

Referring still to FIG. 4A, the photoluminescent structure 54 is arranged over the negative electrode 76 as a coating, layer, film or other suitable deposition. With respect to the presently illustrated embodiment, the photoluminescent structure 54 may be arranged as a multi-layered structure including an energy conversion layer 90, optional stability layer 92, and optional protective layer 94, as described above.

The viewable portion 64 is arranged over the photoluminescent structure 54. In some embodiments, the viewable portion 64 may include a plastic, silicon, or urethane material and is molded over the photoluminescent structure 54 and light-producing assembly 60. Preferably, the viewable portion 64 should be at least partially light transmissible. In this manner, the viewable portion 64 will be illuminated by the photoluminescent structure 54 whenever an energy conversion process is underway. Additionally, by over-sealing the viewable portion 64, it may also function to protect the photoluminescent structure 54 and the light-producing assembly 60. The viewable portion 64 may be arranged in a planar shape and/or an arcuate shape to enhance its viewing potential. Like the photoluminescent structure 54 and the light-producing assembly 60, the viewable portion 64 may also benefit from a thin design, thereby helping to fit the light assembly 22 into small package spaces of the vehicle 10.

In some embodiments, a decorative layer 98 may be disposed between the viewable portion 64 and the photoluminescent structure 54. The decorative layer 98 may include a polymeric material or other suitable material and is configured to control or modify an appearance of the viewable portion 64 of the first light source 22. For example, the decorative layer 98 may be configured to confer an appearance of a trim component (e.g., metallic) on the awning 18 (FIG. 1) to the viewable portion 64 when the viewable portion 64 is in an unilluminated state. In other embodiments, the decorative layer 98 may be tinted any color to complement the awning 18. In any event, the decorative layer 98 should be at least partially light transmissible such that the photoluminescent structure 54 is not prevented from illuminating the viewable portion 64 whenever an energy conversion process is underway.

The overmold material 66 is disposed around the light-producing assembly 60 and/or photoluminescent structure 54. The overmold material 66 may protect the light-producing assembly 60 from physical and chemical damage arising from environmental exposure. The overmold material 66 may have viscoelasticity (i.e., having both viscosity and elasticity), a low Young's modulus, and/or a high failure strain compared with other materials, so that the overmold material 66 may protect the light-producing assembly 60 when contact is made thereto. For example, the overmold material 66 may protect the light-producing assembly 60 from the environmental containments, such as dirt and water, that may come in contact with the awning 18 of the vehicle 10. It is also contemplated that the viewable portion 64 may be formed by a portion of the overmold material 66.

In some embodiments, the photoluminescent structure 54 may be employed separate and away from the light-producing assembly 60. For example, the photoluminescent structure 54 may be positioned on the bottom surface 18B, the sides 18A and/or any surface proximate, but not in physical contact with, the light-producing assembly 60.

Referring now to FIG. 4B, an energy conversion process 104 for producing single color luminescence is illustrated, according to one embodiment. For purposes of illustration, the energy conversion process 104 is described below using the first light assembly 22 depicted in FIG. 4A. In this embodiment, the energy conversion layer 90 of the photoluminescent structure 54 includes a single photoluminescent material 96, which is configured to convert inputted light 100 received from LED sources 72 into an outputted light 102 having a wavelength different than that associated with the inputted light 100. More specifically, the photoluminescent material 96 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application. The converted visible light 102 is outputted from the first light source 22 via the viewable portion 64, thereby causing the viewable portion 64 to illuminate in the desired color. The illumination provided by the viewable portion 64 may offer a unique, substantially uniform, and/or attractive viewing experience that may be difficult to duplicate through non-photoluminescent means.

Figure 4C:
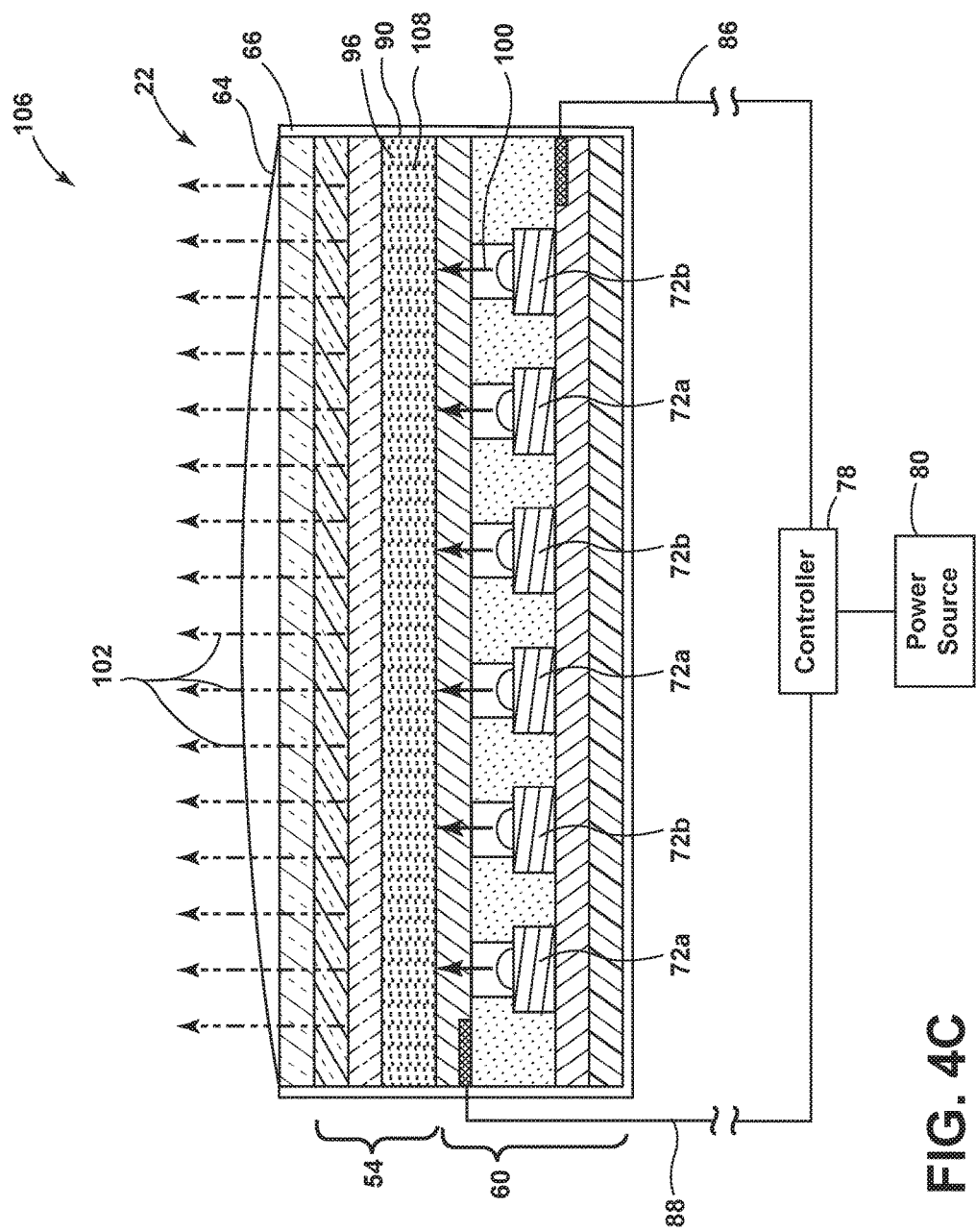
FIG. 4C is a cross-sectional view taken along line II-II of FIG. 1 illustrating an alternate light assembly, according to one embodiment.

Referring to FIG. 4C, a second energy conversion process 106 for generating multiple colors of light is illustrated, according to one embodiment. For consistency, the second energy conversion process 106 is also described below using the second light source 22 depicted in FIG. 4A. In this embodiment, the energy conversion layer 90 includes the first and second photoluminescent materials 96, 108 that are interspersed within the energy conversion layer 90. Alternatively, the photoluminescent materials 96, 108 may be isolated from each other, if desired. Also, it should be appreciated that the energy conversion layer 90 may include more than two different photoluminescent materials 96 and 108, in which case, the teachings provided below similarly apply. In one embodiment, the second energy conversion process 106 occurs by way of down conversion using blue, violet, and/or UV light as the source of excitation.

With respect to the presently illustrated embodiment, the excitation of photoluminescent materials 96, 108 is mutually exclusive. That is, photoluminescent materials 96, 108 are formulated to have non-overlapping absorption spectrums and Stoke shifts that yield different emission spectrums. Also, in formulating the photoluminescent materials 96, 108, care should be taken in choosing the associated Stoke shifts such that the converted light 102 emitted from one of the photoluminescent materials 96, 108, does not excite the other, unless so desired. According to one exemplary embodiment, a first portion of the LED sources 72, exemplarily shown as LED sources 72a, is configured to emit an inputted light 100 having an emission wavelength that only excites photoluminescent material 96 and results in the inputted light 100 being converted into a visible light 102 of a first color (e.g., white). Likewise, a second portion of the LED sources 72, exemplarily shown as LED sources 72b, is configured to emit an inputted light 100 having an emission wavelength that only excites second photoluminescent material 108 and results in the inputted light 100 being converted into a visible light 102 of a second color (e.g., red). Preferably, the first and second colors are visually distinguishable from one another. In this manner, LED sources 72a and 72b may be selectively activated using the controller 78 to cause the photoluminescent structure 54 to luminesce in a variety of colors. For example, the controller 78 may activate only LED sources 72a to exclusively excite photoluminescent material 96, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 96, 108 to become excited, resulting in the viewable portion 64 illuminating in a third color, which is a color mixture of the first and second colors (e.g., pinkish). The intensities of the inputted light 100 emitted from each of the LED sources 72a and 72b may also be proportionally varied to one another such that additional colors may be obtained. For energy conversion layers 90 containing more than two distinct photoluminescent materials 96, a greater diversity of colors may be achieved. Contemplated colors include red, green, blue, and combinations thereof, including white, all of which may be achieved by selecting the appropriate photoluminescent materials 96 and correctly manipulating the corresponding LED sources 72.

Figure 4D:
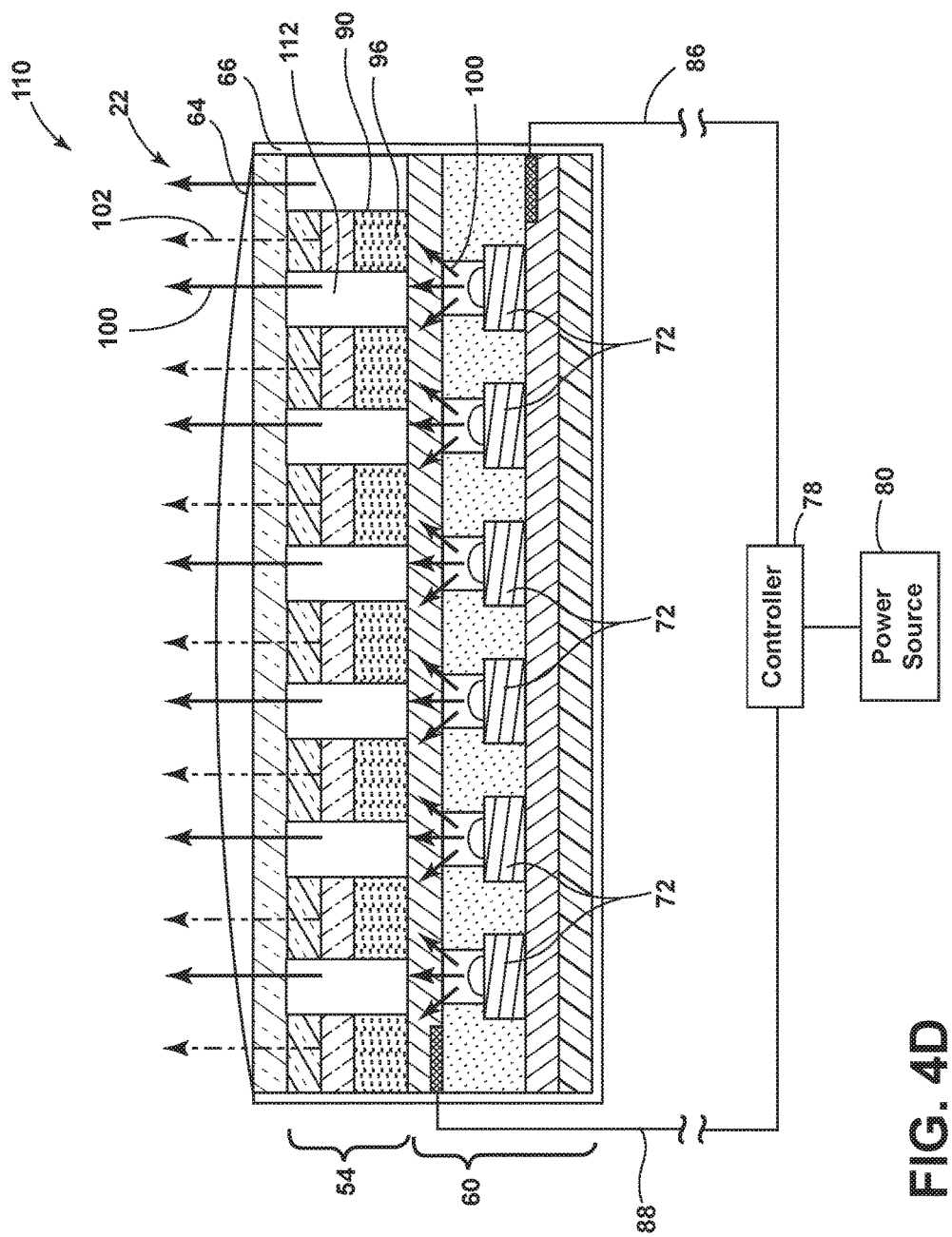
FIG. 4D is a cross-sectional view taken along line II-II of FIG. 1 illustrating a light assembly having a luminescent structure separated by light transmissive portions disposed on the light source, according to another embodiment.

Referring to FIG. 4D, a third energy conversion process 110 includes the light-producing assembly 60, such as the one described in reference to FIG. 4A, and the photoluminescent structure 54 disposed thereon, according to an alternate embodiment. The photoluminescent structure 54 is configured to convert inputted light 100 received from LED sources 72 into a visible light 102 having a wavelength different than that associated with the inputted light 100. More specifically, the photoluminescent structure 54 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application.

The photoluminescent structure 54 may be applied to a portion of the light-producing assembly 60, for example, in a stripped manner. Between the photoluminescent structures 54 may be light transmissive portions 112 that allow inputted light 100 emitted from the LED sources 72 to pass therethrough at the first wavelength. The light transmissive portions 112 may be an open space, or may be a transparent or translucent material. The light 100 emitted through the light transmissive portions 112 may be directed from the light-producing assembly 60 towards a second photoluminescent structure 54 disposed proximate to the light-producing assembly 60. The second photoluminescent structure 54 may be configured to luminesce in response to the inputted light 100 that is directed through the light transmissive portions 112.

Referring to FIG. 4E, a fourth energy conversion process 114 for generating multiple colors of light utilizing the light-producing assembly 60, such as the one described in reference to FIG. 4A, and a photoluminescent structure 54 disposed thereon is illustrated. In this embodiment, the photoluminescent structure 54 is disposed over a top portion of the light-producing assembly 60. The excitation of photoluminescent material 96 is formulated such that a portion of inputted light 100 emitted from LED sources 72c, 72d passes through the photoluminescent structure 54 at the first wavelength (i.e., the inputted light 100 emitted from the first light source 22 is not converted by the photoluminescent structure 54). The intensity of the emitted light (i.e., the combination of the inputted light 100 and outputted light 102) may be modified by pulse-width modulation or current control to vary the amount of inputted light 100 emitted from the LED sources 72c, 72d that pass through the photoluminescent structure 54 without converting to a second, outputted 102 wavelength. For example, if the first light source 22 is configured to emit light 100 at a low level, substantially, all of the light 100 may be converted to outputted light 102. In this configuration, a color of light 102 corresponding to the photoluminescent structure 54 may be emitted from the light-producing assembly 60. If the first light source 22 is configured to emit inputted light 100 at a high level, only a portion of the first wavelength may be converted by the photoluminescent structure 54. In this configuration, a first portion of the emitted light may be converted by the photoluminescent structure 54 and a second portion of the emitted light may be emitted from the light-producing assembly 60 at the first wavelength towards additional photoluminescent structures disposed proximately to the light assembly 22. The additional photoluminescent structures may luminesce in response to the light 100 emitted from the light assembly 22.

According to one exemplary embodiment, a first portion of the LED sources 72, exemplarily shown as LED sources 72c, is configured to emit an inputted light 100 having a wavelength that excites the photoluminescent material 96 within the photoluminescent structure 54 and results in the inputted light 100 being converted into a visible light 102 of a first color (e.g., white). Likewise, a second portion of the LED sources 72, exemplarily shown as LED sources 72d, are configured to emit an inputted light 100 having a wavelength that passes through the photoluminescent structure 54 and excites additional photoluminescent structures disposed proximately to the awning 18, vehicle 10 and/or sales bins 14, thereby illuminating in a second color. The first and second colors may be visually distinguishable from one another. In this manner, LED sources 72c and 72d may be selectively activated using the controller 78 to cause the vehicle 10 to luminesce in a variety of colors.

The light-producing assembly 60 may also include optics 116 that are configured to direct light 100 emitted from the LED sources 72c, 72d and the light 102 emitted from the photoluminescent structure 54 towards pre-defined locations. For example, emitted light 102 from the LED sources 72c, 72d and the photoluminescent structure 54 may be directed and/or focused towards specific sales bins 14 or set of sales bins 14. Further, by activating different portions of the first light source 22, each having different optics 116, a variety of individual sales bins 14 may be illuminated based on sensed preferences from the electronic device 34.

Figure 5:
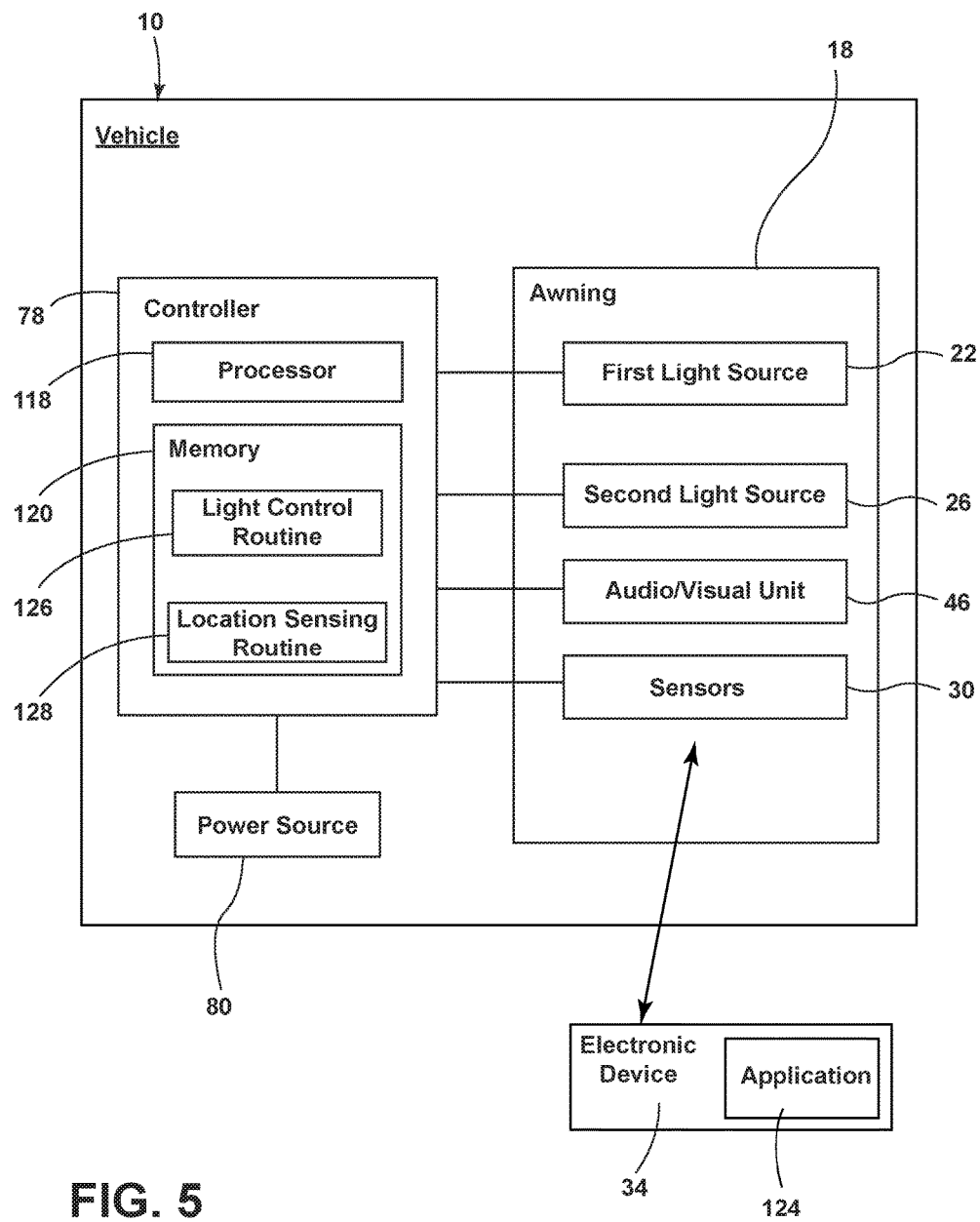
FIG. 5 is a block diagram of the vehicle and the lighting system.

Referring to FIG. 5, a block diagram of the vehicle 10 is shown in which the first and second light sources 22, 26 are positioned on the awning 18. The power source 80 is connected to the first and second light sources 22, 26, through the controller 78, to provide power to the LEDs 72. The vehicle 10 and awning 18 are also equipped with one or more sensors 30 for detecting if a person and electronic device 34 are near. The sensors 30 may include wireless communication transceivers. The sensors 30 may communicate with the electronic device 34 over a wireless signal (e.g., radio frequency). In a specific example, the sensors 30 may be a Bluetooth™ RN4020 module, or an RN4020 Bluetooth™ low energy PICtail board configured to communicate with the electronic device 34 using Bluetooth™ low energy signals. The sensors 30 may include a transmitter and a receiver to transmit and receive wireless signals (e.g., Bluetooth™ signals) to and from the electronic device 34. It will be appreciated that the sensors 30 may utilize other forms of wireless communication between with the electronic device 34 and other sensors 30 such as Wi-Fi™. The controller 78 may include a processor 118 and a memory 120 for executing stored routines or for storing information (e.g., related to the operation of the first and second light sources 22, 26 and/or the electronic device 34). The sensors 30 are configured to communicate with the processor such that one or more of the routines stored in the memory 120 is activated. The electronic device 34 may include one or more routines which control the communication between the sensors 30 and the electronic device 34. For example, in mobile smart phone embodiments of the electronic device 34, the phone may include one or more applications 124 configured to communicate with the sensors 30. In the depicted embodiment, the memory 120 of the controller 78 includes a light control routine 126 and a location sensing routine 128. In various embodiments, the sensors 30 are standalone devices that are not in communication with body control modules, electronic control modules, engine control modules and/or other features of the vehicle 10. For example, the sensors 30 may only be capable of communication with the controller 78 and the electronic device 34. In other embodiments, the sensors 30 may communicate with multiple components of the vehicle 10 (e.g., body controller or other onboard controllers).

The vehicle 10 may include a plurality of sensors 30, positioned around the vehicle 10 (e.g., a rear, sides, or front of the vehicle 10) and awning 18 (e.g., top surface, bottom surface 18B, sides 18A, etc.). The sensors 30 may be in communication with one another or may mutually communicate with a master controller or module (e.g., body control module). The electronic device 34 may communicate with all, some, or none of the sensors 30 as the electronic device 34 enters and exits the communication range of the sensors 30. Each of the sensors 30 may be aware of its location within the vehicle 10 and capable of sharing its location with the electronic device 34. In various embodiments, the sensors 30 are capable of communicating with the electronic device 34 such that the location of the electronic device 34 may be determined therefrom (e.g., based on signal strength and/or return time of the signal) or vice versa. According to one embodiment, the location sensing routine 128 in the memory 120 of the controller 78 may utilize the signal strength and time to return of the signals between the sensors 30 and the electronic device 34 to triangulate the position of the electronic device 34 as the person moves around the vehicle 10 and awning 18. In embodiments where the sensors 30 communicate with a master module, the location of the electronic device 34 may be calculated in the master module. The location of the electronic device 34 may have sufficient resolution to determine which sales bins 14 (FIG. 1) the user is approaching or standing in front of. The determined location may then be utilized by the light control routine 126, or a sales routine, as described in greater detail below. It will be understood that the location sensing routine 128 may be located on the electronic device 34 and that any location determinations may be made by the electronic device 34 and shared with the sensors 30 without departing from the spirit of this disclosure.

The light control routine 126 may process signals from the sensors 30 (e.g., the location of the electronic device 34) to activate and/or change light emitted from the first and second light sources 22, 26. Depending on the signals received from the sensors 30, the light control routine 126 may be activated. The light control routine 126 may store a predetermined pattern of illumination for the first and second light sources 22, 26 based on detected properties of the electronic device 34 (e.g., known or unknown device, location, product preferences, and user specific data). For example, the light control routine 126 may control second light source 26 to illuminate specific sales bins 14 (FIG. 1) which contain products the user of the electronic device 34 has previously purchased based on user purchase history. The electronic device 34 may store user specific data and preferences relating to the sales bins 14 (e.g., type of products enjoyed by the user, preferred brand, etc.) and lighting (e.g., color, intensity, pattern, activation distance, etc.) and/or the memory 120 may store this data. The sensors 30 may detect and pull preference related to the sales bins 14 from the electronic device 34.

The application 124 of the electronic device 34 may be used to aid in sales from the vehicle 10. For example, a user of the electronic device 34 may hail the vehicle 10 using the application 124, determine the next stopping location of the vehicle 10, determine how long the vehicle 10 will remain at its current position, determine the types of products carried in the sales bins 14 (FIG. 1), make selections and pay for products and/or communicate with an owner/operator of the vehicle 10. Further, the application 124 may allow for activation of the alert switch 44 (FIG. 1). It will be understood that the application 124 may also be utilized while the electronic device 34 is not proximate the vehicle 10. For example, the application 124 may provide notifications about the current location of the vehicle 10 and/or products carried by the vehicle 10. The application 124 may also be configured to allow the user of the electronic device 34 to schedule the vehicle 10 at a certain location. Further, the application 124 may allow a user to preorder a product prior to the vehicle 10 arriving (i.e., placing a certain product on hold for the customer).

A variety of advantages may be derived from the use of the present disclosure. First, use of the retractable awning 18 may allow the vehicle 10 to protect the sales bins 14, and the products contained therein, from environmental exposure and theft. Further, the awning 18 may protect customers from the environment (e.g., precipitation, sun, etc.). Second, use of the first and second light sources 22, 26 may allow for a variety of unique and attractive lighting effects to be applied which may aid in sales and/or safety. Further, as explained above, changing color, intensity or patterns of the first and second light sources 22, 26 may provide information to customers of the vehicle 10. Third, use of the displays 38 allow a wide variety of information about the vehicle 10 to be communicated to customers in a simple and easy to understand manner. Fourth, use of the sensors 30 allow the vehicle 10 to dynamically communicate with the electronic device 34. Such dynamic communication allows the vehicle 10 to communicate with the consumer directly while also allowing a creation of lighting effects configured to enhance sales for the vehicle 10 as explained above.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. An autonomous vehicle comprising:
    a plurality of sales bins positioned on a side of the vehicle;
    an awning configured to deploy from the vehicle over the sales bins, the awning comprising:
        a first light source configured to illuminate a ground space proximate the awning; and
        a second light source configured to illuminate the sales bins; and
    a sensor is configured to detect an electronic device proximate the vehicle and detect sales bin preferences from the electronic device to control the first and second light sources based upon the detected sales bin preferences.

2. The autonomous vehicle of claim 1, further comprising:
    a display configured to deploy from at least one of a front or a rear of the vehicle.

3. The autonomous vehicle of claim 2, wherein the display is illuminated.

4. The autonomous vehicle of claim 3, wherein the display is operable between an undeployed and a deployed position, the display extending from the vehicle in the deployed position.

5. The autonomous vehicle of claim 1, wherein the awning further comprises a camera.

6. The autonomous vehicle of claim 1, wherein at least one of the first and second light sources are configured to illuminate a single sales bin of the plurality of sales bins.

7. A vehicle comprising:
    a plurality of bins positioned on the vehicle;
    an awning configured to deploy from the vehicle proximate the bins, the awning comprising a light source configured to illuminate the bins; and
    a sensor for detecting an electronic device proximate the vehicle, the sensor configured to detect bins preferences from the electronic device to control the first and second light sources based upon the detected bins preferences.

8. The vehicle of claim 7, further comprising:
    an alert switch positioned on the vehicle.

9. The vehicle of claim 7, wherein the light source comprises a printed light emitting diode.

10. The vehicle of claim 7, wherein the sensor comprises one or more wireless communication transceivers for detecting and determining a location of the electronic device.

11. The vehicle of claim 10, wherein the electronic device is a mobile communication device.

12. The vehicle of claim 11, further comprising:
    a photoluminescent structure disposed on the awning proximate the light assembly.

13. The vehicle of claim 12, wherein the light source is configured to emit light at a first wavelength and the photoluminescent structure is configured to convert the first wavelength to at least a second wavelength longer than the first wavelength.

14. A vehicle comprising:
    a plurality of bins positioned on the vehicle;
    an awning configured to deploy from the vehicle proximate the bins; and
    a sensor for detecting an electronic device proximate the vehicle, wherein the sensor is configured to detect bin preferences from the electronic device and to dynamically communicate to the electronic device what products are carried within the plurality of bins based upon the detected bin preferences.

15. The vehicle of claim 14, wherein the sensor configured to detect sales bins preferences.

16. The vehicle of claim 15, wherein the sensor comprises one or more wireless communication transceivers for detecting and determining a location of the electronic device.

17. The vehicle of claim 16, wherein the electronic device is a mobile communication device.

18. The vehicle of claim 17, further comprising:
    a display configured to deploy from at least one of a front or a rear of the vehicle.

19. The vehicle of claim 18, wherein a light source is configured to illuminate a single bin based on detected preferences from an electronic device.

* * * * *